US009130299B2

(12) United States Patent
Nachbauer et al.

(10) Patent No.: US 9,130,299 B2
(45) Date of Patent: Sep. 8, 2015

(54) ELECTRICAL PLUG TYPE CONNECTOR

(75) Inventors: Otto Nachbauer, Floss (DE); Richard Riedel, Floss (DE); Christian Eiletz, Weiden (DE)

(73) Assignee: NEXANS (FR)

( * ) Notice: Subject to any disclaimer, the term of this patent is extended or adjusted under 35 U.S.C. 154(b) by 46 days.

(21) Appl. No.: 12/148,947

(22) Filed: Apr. 23, 2008

(65) Prior Publication Data

US 2008/0280481 A1 Nov. 13, 2008

(30) Foreign Application Priority Data

Apr. 26, 2007 (EP) .................................... 07290530

(51) Int. Cl.

*B23P 19/00* (2006.01)
*H01R 13/00* (2006.01)
*H01R 13/52* (2006.01)

(52) U.S. Cl.

CPC .................................. *H01R 13/5202* (2013.01)

(58) Field of Classification Search

USPC ......... 439/480, 483, 476.1, 926; 29/758, 747, 29/764

See application file for complete search history.

(56) References Cited

U.S. PATENT DOCUMENTS 3,574,254 A * 4/1971 Harris ............................ 29/747
4,323,979 A * 4/1982 Johnston .................. 361/679.32
5,478,243 A * 12/1995 Hopkins et al. ................. 439/35
5,879,173 A * 3/1999 Poplawski et al. ............ 439/138
7,020,376 B1 * 3/2006 Dang et al. ..................... 385/135
7,384,299 B1 * 6/2008 Bridges et al. ................ 439/445
7,458,144 B2 * 12/2008 Barina et al. ..................... 29/794
7,534,128 B2 * 5/2009 Caveney et al. .............. 439/480

FOREIGN PATENT DOCUMENTS

DE 19752921 6/1999

* cited by examiner

*Primary Examiner* — Neil Abrams
(74) *Attorney, Agent, or Firm* — Sofer & Haroun, LLP

(57) ABSTRACT

Method for producing an electrically conductive connection between a component (1), which is positioned in a housing, is equipped with electrical contacts and is accessible from the outside through an opening located in a wall of the housing, and a feed source, using a plug-type element (6), which is equipped with electrical mating contacts (7) and is fitted to the end of an electrical line, which is connected to the feed source and has at least two insulated conductors (8). The plug-type element (6)together with conductors (8) connected thereto is first fixed on one end of a holder (9) made from plastic, whose outer dimensions are smaller than the clear width of the opening (4) of the housing (3). Then the plug-type element (6) is passed through the opening (4) of the housing (3) by means of the holder (9) and is plugged onto the contacts (2) of the component (1). Finally the holder (9) is detached from the plug-type element (6) once the end position of the plug-type element (6) has been reached, whilst remaining in the housing (3) or in its opening (4). The holder (9) may also support a closure (12) to close the opening (4).

3 Claims, 3 Drawing Sheets

ELECTRICAL PLUG TYPE CONNECTOR

RELATED APPLICATION

This application claims the benefit of priority from European Patent Application No. 07290530.0, filed on Apr. 26, 2007, the entirety of which is incorporated herein by reference.

FIELD OF THE INVENTION

The invention relates to a method for producing an electrically conductive connection between a component, which is arranged in a housing, is equipped with electrical contacts and is accessible from the outside through an opening located in a wall of the housing, and a feed source, using a plug-type element, which is equipped with electrical mating contacts and is fitted to the end of an electrical line, which is connected to the feed source and has at least two insulated conductors.

BACKGROUND

Such a method is used, for example, in automotive engineering in order to connect components, which are arranged in a housing which is closed per se, such as sensors of a wide variety of types, for example, via an electrical line to a feed source arranged in a control unit. "Feed source" can in this case be a current source or a signal source or a combined current and signal source. A preferred field of use for the method in accordance with the invention is that of making contact with a sensor for an electrical power-assisted steering system, which is arranged in a housing connected to a steering wheel of a motor vehicle. A plug-type element which is connected to such a sensor should be fitted in such a way that no shocks or vibrations occurring during operation of a motor vehicle are transmitted to the sensor thereby.

DE 197 52 921 A1 describes an electrical plug-type connector for producing an electrically conductive connection protruding through a housing wall. The plug-type connector comprises a pin housing having electrical plug-type contacts and a guide sleeve, which is to be connected detachably to the pin housing. It is used, for example, for electrically connecting transmission controllers in motor vehicles. In the use position, the guide sleeve is positioned in such a way that it is sealed off in an opening of the housing wall, through which it protrudes in such a way that it is accessible from both sides. The pin housing is fixed on the guide sleeve by means of the bayonet-type closure.

OBJECTS AND SUMMARY

The invention is based on the object of configuring the method mentioned at the outset in such a way that the component can be electrically conductively connected in a simple manner to a feed source without any mechanical loading.

This object is achieved according to the invention by virtue of the fact

- that the plug-type element with conductors connected thereto is first fixed on one end of a holder made from plastic, whose outer dimensions are smaller than the clear width of the opening of the housing,
- that then, the plug-type element is passed through the opening of the housing by means of the holder and is plugged onto the contacts of the component and
- that the holder is then detached from the plug-type element once the end position of the plug-type element has been reached, whilst remaining in the housing or in its opening.

With this method, the plug-type element is brought into its end position in a simple manner by means of the holder, which acts as a mounting aid, in which end position its mating contacts have been plugged onto the contacts of the component to be connected to the feed source. Then, the holder is detached within the housing from the plug-type element, with the result that shocks or vibrations which act on the holder from the outside are not transmitted to the plug-type element and the component. In this case, the holder, through which the conductors connected to the plug-type element are also passed, remains in the housing or in its opening, in which housing or opening it is finally fixed.

In a preferred embodiment, the holder has a closure element for closing the opening of the housing, which closure element closes the opening in the housing preferably in a moisture-tight manner once the method has been completely implemented. The component including the plug-type element and other parts located in the housing are then at the same time protected from contamination.

The method in accordance with the invention will be explained with reference to the drawings in terms of exemplary embodiments.

DETAILED DESCRIPTION

Figure 1:
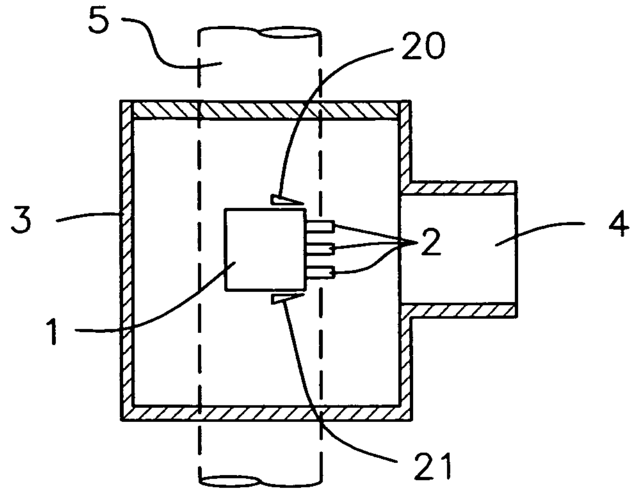
FIG. 1 shows a schematic illustration of a housing with an electrical component, with which contact is intended to be made using the method in accordance with the invention.

In FIG. 1, element 1 denotes an electrical component, which is equipped with electrical contacts 2. This component will be referred to as "sensor 1" in the text which follows. In the course of preassembly, the sensor 1 is arranged in a housing 3 which is then closed. The contacts 2 are, for example, in the form of plug pins. The housing 3 which is closed per se has an opening 4 which is at first still open and at whose height the sensor 1 is fitted and through which the sensor 1 is accessible for the purpose of electrically conductively connecting it to a feed source (not illustrated).

The sensor 1 may be, for example, an element of an electrically operated power-assisted steering system of a motor vehicle, which is to be electrically conductively connected to a control unit thereof, in which control unit a current and/or signal source is provided as the feed source. In FIG. 1, in this context a steering axle 5 of a motor vehicle is illustrated by dashed lines, around which steering axle the housing 3 is arranged. The configuration of the sensor 1 is as desired within broad limits. No further details relating to said sensor have therefore been given. It can, for example, also be coupled to a device which is capable of moving together with the steering axle 5.

Figure 2:
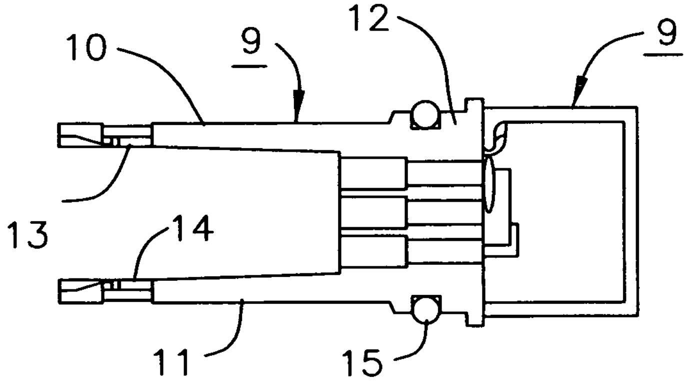
FIGS. 2 and 3 show two different views of a holder which can be used in the method.
Figure 3:
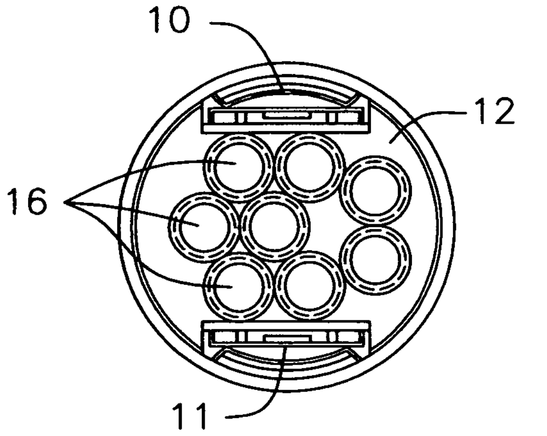
Figure 4:
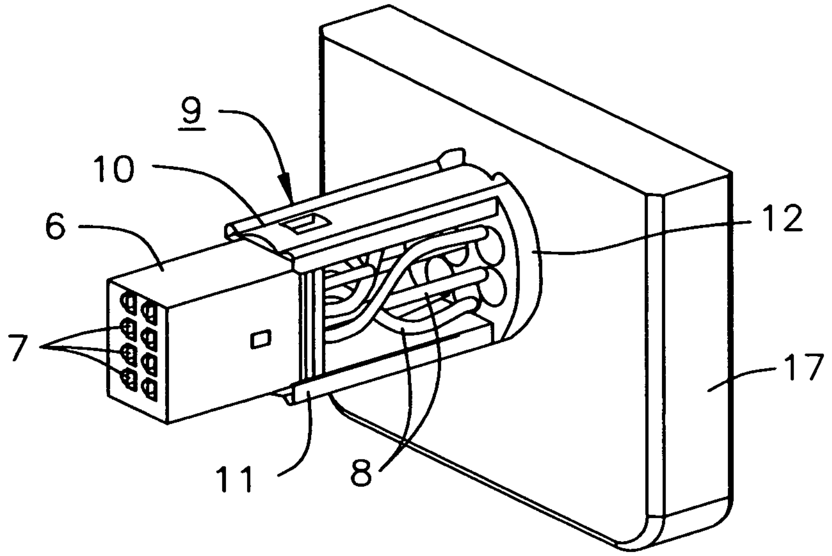
FIG. 4 shows the holder shown in FIGS. 2 and 3 with a plug-type element fitted thereon.

In order to connect the sensor 1 to a feed source, a plug-type element 6 (shown in FIGS. 4 and 5) with mating contacts 7 for the contacts 2 of the sensor 1 can be used, to which mating contacts 7 insulated conductors 8 of a corresponding connecting line (not illustrated) are connected. The mating contacts 7 are, for example, in the form of plug-type sockets, which can be plugged onto plug pins of the sensor 1. The plug-type element 6 in FIG. 4 is fixed in a holder 9 made from plastic, whose configuration can be seen, for example, in FIGS. 2 and 3.

Figure 6:
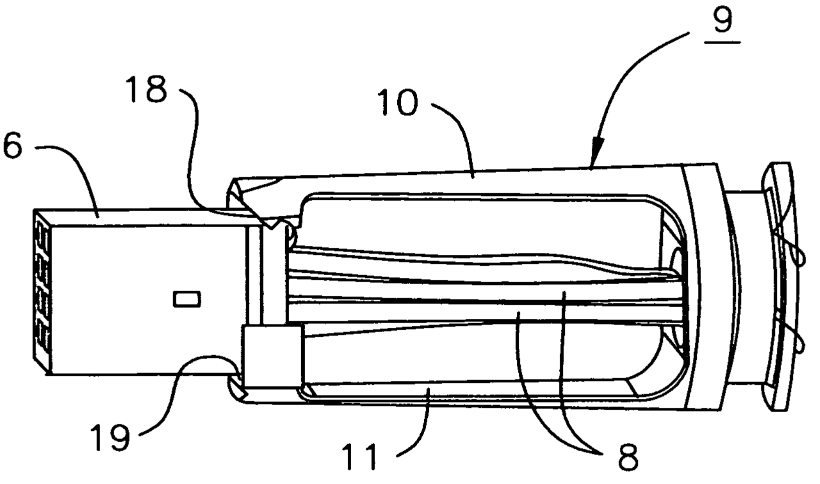
FIGS. 6 and 7 show an embodiment of the holder which is different from that in FIGS. 2 and 3.

The holder 9 comprises two arms 10 and 11, which run parallel to one another at a distance and are dimensioned in such a way that the outer dimensions of the holder 9 are smaller than the clear width of the opening 4 of the housing 3 and which are connected to one another at one end by a closure element 12. At their free ends remote from the closure element 12, the two arms 10 and 11 each have a groove-shaped depression 13 and 14, respectively. In addition, the closure element 12 has an O ring 15, which serves the purpose of sealing off the opening 4 in the housing 3. In the assembled position, the plug-type element 6 shown in FIG. 4 is fixed between the free ends of the arms 10 and 11 in such a way that it protrudes beyond said arms or beyond the holder 9 with a substantial length, as is illustrated in FIGS. 4 and 6. In the process, projections fitted on the plug-type connector 6 engage in the depressions 13 and 14 of the arms 10 and 11.

Figure 5:
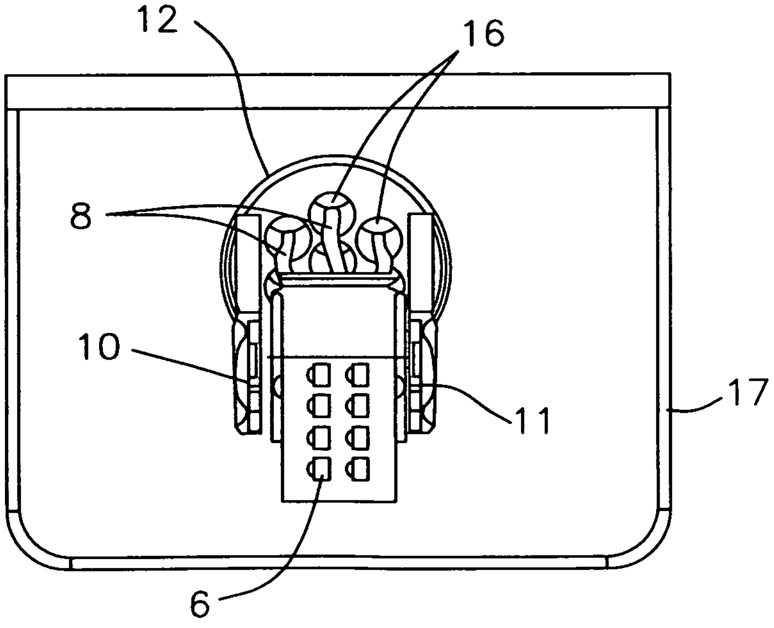
FIG. 5 shows the holder detached from the plug-type element.

The closure element 12, which is matched in terms of its outer contour to the dimensions of the opening 4 of the housing 3, is provided with passages 16, through which the conductors 8 can be passed in a moisture-tight manner, as is illustrated in FIG. 5.

The method in accordance with the invention is implemented, for example, as follows:

The assembled position of the plug-type element 6 fixed in the holder 9 is shown in FIG. 4. In this case, in addition a section 17 of the wall of the housing 3 is also illustrated, in which wall the opening 4 is located. In order to achieve this assembled position, the holder 9 equipped with the plug-type element 6 has been inserted through the opening 4 into the housing 3 until the plug-type element 6 has been plugged completely onto the contacts 2 of the sensor 1. Once the assembled position has been reached, the closure element 12 of the holder 9 is located in the opening 4, which is preferably closed in a moisture-tight manner by said closure element 12. The sensor 1 onto whose contacts 2 the plug-type element 6 has been plugged in the assembled position is not illustrated in FIG. 4 for reasons of clarity.

This also applies to FIG. 5, which shows the position of the holder 9 once it has been detached from the plug-type element 6. For this purpose, the holder 9 is rotated out of its assembled position illustrated in FIG. 4 about the axis of the plug-type element 6, to be precise preferably through an angle of 90°, with the result that the arms 10 and 11 are detached from the plug-type element 6 and are separated from it by air gaps. During the corresponding rotation of the holder 9, the closure element 12 which is located in the opening 4 is also rotated along and in the process is fixed firmly and in a moisture-tight manner in the opening 4, for example by means of a bayonet-type closure. Once the method is complete, there is no longer a connection between the holder 9 and the plug-type element 6, with the result that no shocks can be transmitted from the holder 9 to the sensor 1. This applies in principle also to the conductors 8, which are connected to the plug-type element 6 and which preferably run nonlinearly or in undulating fashion between the plug-type element 6 and the closure element 12, as is illustrated in FIGS. 4, 5 and 6.

Figure 7:
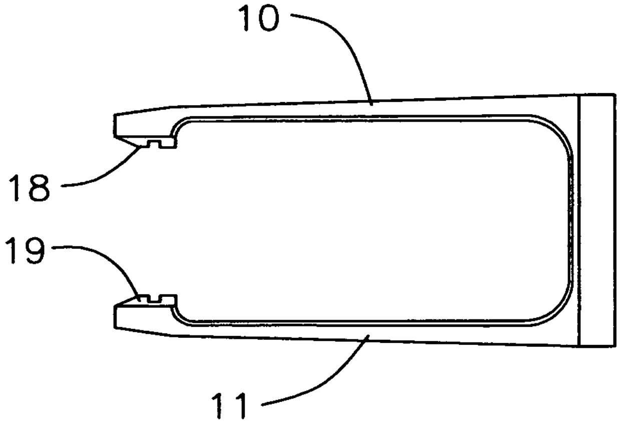

In another embodiment illustrated in FIGS. 6 and 7, the holder 9 can also be equipped at the free ends of its arms 10 and 11 with bevels 18 and 19, which serve the purpose of lifting the arms 10 and 11 off from the plug-type element 6. In this embodiment of the holder 9, the latter is pushed beyond the plug-type element 6 in the plug-in direction if said plug-type element 6 has reached the assembled position on the sensor 1. In this embodiment, in each case one sloping ramp 20 or 21 (indicated schematically in FIG. 1) is fitted on both sides of the sensor 1 in the housing 3, onto which ramps 20 and 21 the arms 10 and 11 are pushed with their bevels 15 and 16 until they are detached from the plug-type element 6. At the end of this method, in this embodiment of the holder 9 the closure element 12 is likewise positioned firmly in the opening 4, for example by means of being latched in, and closes said opening in a moisture-tight manner.

What is claimed is:

1. Method for producing an electrically conductive connection between a component, which is arranged in a housing, is equipped with electrical contacts and is accessible from the outside through an opening located in a wall of the housing, and a feed source, using a plug-type element, which is equipped with electrical mating contacts and is fitted to the end of an electrical line, which is connected to the feed source and has at least two insulated conductors, said method comprising the steps of:

fixing the plug-type element with conductors connected thereto on one end of a holder made from plastic, whose outer dimensions are smaller than the clear width of the opening of the housing, passing the plug-type element through the opening of the housing by means of the holder and is plugged onto the contacts of the component; and detaching the holder from the plug-type element once the end position of the plug-type element has been reached, whilst remaining in the housing or in its opening, wherein the holder is rotated around the plug-type element so as to release the plug-type element in a position in which a closure element, which is part of the holder, is in the opening of the housing, the closure element being locked at the same time in the opening by means of the rotational movement.

2. Method according to claim 1, wherein the holder including the closure element is rotated through an angle of 90°.

3. Method for producing an electrically conductive connection between a component, which is arranged in a housing, is equipped with electrical contacts and is accessible from the outside through an opening located in a wall of the housing, and a feed source, using a plug-type element, which is equipped with electrical mating contacts and is fitted to the end of an electrical line, which is connected to the feed source and has at least two insulated conductors, said method comprising the steps of:

fixing the plug-type element with conductors connected thereto on one end of a holder made from plastic, whose outer dimensions are smaller than the clear width of the opening of the housing, passing the plug-type element through the opening of the housing by means of the holder and is plugged onto the contacts of the component; and detaching the holder from the plug-type element once the end position of the plug-type element has been reached, whilst remaining in the housing or in its opening wherein the holder is pushed in the plug-in direction beyond the plug-type element on ramps arranged in the housing until it is detached from the plug-type element and a closure element, which is part of the holder, is positioned firmly in the opening of the housing.

* * * * *